Patented Mar. 12, 1946

2,396,328

UNITED STATES PATENT OFFICE 2,396,328

MONAZO PIGMENTS

Donovan E. Kvalnes and Harold E. Woodward, Penns Grove, N. J., assignors to E. I. du Pont de Nemours & Company, Wilmington, Del., a corporation of Delaware No Drawing. Application February 10, 1942, Serial No. 430,238

7 Claims. (Cl. 260—151)

This invention relates to new monazo pigments and especially to certain metal complexes of monazo compounds of the class in which the coupling component is 2-hydroxy-3-naphthoic acid and the diazo component is an arylamine having one diazotizable amino group and is devoid of hydroxy groups ortho to the primary amino group as well as of carboxy and sulfonic acid groups.

It is among the objects of the invention to provide new pigments ranging in shade through yellows, reds, blues and browns which have properties desirable for coloring inks, paints, textile printing emulsions, bases and similar compositions. Other objects will be apparent from the following description.

The objects of the invention are attained in general by coupling with 2-hydroxy-3-naphthoic acid a diazotized arylamine which is devoid of hydroxy groups ortho to the sole diazotizable amino group and which is devoid of carboxy groups and sulfonic acid groups, and then forming a nickeliferous or cobaltiferous metal complex which contains two metal atoms per two molecules of the monazo combination, at least one of the metal atoms being nickel or cobalt and the other metal atom being from a group consisting of metals having an atomic weight of 54 to 65, and the alkaline earth metals, such as cadmium, copper, nickel, cobalt, chromium, iron, manganese, calcium, barium, strontium and zinc.

The invention will be more fully set forth in the following more detailed description which includes examples that are given as illustrative embodiments of the invention and not as limitations thereof. Parts are expressed in parts by weight unless otherwise noted.

Example 1

Para-nitro-aniline (138 parts) was diazotized with 91 parts of hydrochloric acid (100%) and 69 parts of sodium nitrite. The solution of the diazonium chloride was added to an alkaline solution containing 200 parts of 2-hydroxy-3-naphthoic acid, 42 parts of sodium hydroxide and 159 parts of sodium carbonate in 4000 parts of water, the temperature being kept at 10° C. during the coupling. After the coupling was complete, the insoluble monazo compound was filtered and washed. It was then stirred into 4000 parts of water. To this slurry was added a solution consisting of 262 parts of nickel chloride ($NiCl_2.6H_2O$) in 500 parts of water to which had been added 500 parts of concentrated ammonium hydroxide. The suspension was heated to 90° C. and held at this temperature for 3 hours. It was then filtered and the resulting pigment was washed.

Analysis of the product showed that it contained one atom of nickel to two atoms of nitrogen, exclusive of ammoniacal nitrogen and the nitrogen of the nitro group. It contained ½ molecule of coordinated ammonia.

The compound exclusive of coordinated ammonia or water is represented by the formula

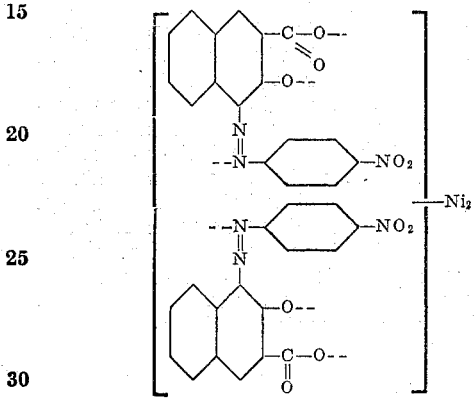

This pigment was incorporated in typical vehicles for the printing of textiles, such as water-in-lacquer and lacquer-in-water emulsions in which the lacquer phase contained pigment-binding agents, and in aqueous systems containing film forming materials. Cotton cloth was printed with these pigmented vehicles, and the prints were dried at 150° C. for 5 minutes. The Bordeaux colored prints were given excessively long exposures in a Fade-ometer without showing any fading. In light fastness this pigment compares favorably with the more costly pigments of similar color which are suitable for use in lacquers for the printing of textiles. The prints also showed excellent fastness to laundry tests and to solvents used in dry cleaning and in "trubenizing."

A portion of the above described pigment was dried and ground in lithographic varnish. The ink had a deep maroon masstone and very good tinting strength. The printing tone showed no fading when given an excessively long exposure in the Fade-ometer. A 1% tint on zinc oxide showed excellent resistance to fading.

A portion of the dried pigment was milled with dextrin and a dispersing agent, such as the condensation product of beta-naphthalene-sulfonic acid and formaldehyde, and the water dispersible pigment was used for coloring paper pulp. The paper was dyed a bluish red or Bordeaux color which showed very good fastness to light.

Another portion of the dried pigment was ground in nitrocellulose lacquer and the pigmented lacquer was sprayed on a piece of sheet steel. The dark maroon panel showed very good stability to light.

Another portion of the dried pigment was used for pigmenting linoleum. Test strips of the linoleum were found to have very good light fastness when exposed in a Fade-ometer and very good resistance to soaping when they were soaked in a hot 2% soap solution.

This pigment was also used for coloring rubber in the following manner. Pale crepe rubber (100 parts) was mixed on a rubber mill with 5 parts of zinc oxide, 15 parts lithopone, 37.25 parts blanc fixe, 1 part of a mixture consisting of 97% of the zinc salt of mercapto-benzo-thiazole and 3% of tetra-methyl-thiuram-mono-sulfide, 1.75 parts sulfur and 1.6 parts of the nickel pigment of this example. The mixture was vulcanized on a press at 40 pounds steam pressure for 10 minutes. A strong maroon colored rubber product was obtained. The color showed very little migration into a thin strip of uncolored rubber mixture vulcanized in contact with the colored rubber.

*Example 2*

The pigment of Example 1 was made by a modified process in which the monazo coupling was made in acid solution by using 200 parts of sodium acetate as buffer in place of 159 parts of sodium carbonate. The metallization was modified in that it was carried out in the presence of 40 parts of 50% para soap which was added before the solution of nickel ammonium chloride was added. The pigment had the same chemical analysis as that obtained in Example 1, but it gave a much bluer color when printed on cotton from a lacquer emulsion, and in inks it gave a darker masstone and a bluer tint.

The product is represented by the formula

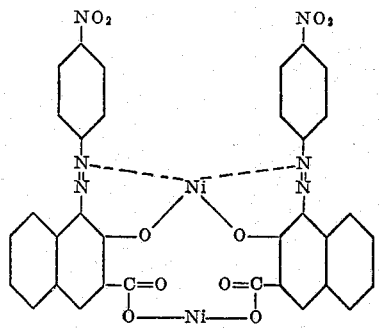

The same pigment was made by the same process except that about two molecular equivalents of sodium hydroxide were used as the acid acceptor instead of ammonia. The sodium hydroxide in dilute water solution was gradually added to the metallization medium as the metallization proceeded and at a rate such that the medium had a pH value of 6.8 to 7.0

*Example 3*

By using an equal weight of cobaltous chloride ($CoCl_2.6H_2O$) in place of the $NiCl_2.6H_2O$ in Example 1, a pigment was obtained which was somewhat duller and less fast to light than the pigment of Example 1. When hydrogen peroxide was added to the metallizing medium, in order to form a cobaltic compound, the resulting pigment was browner and slightly better in light fastness.

*Example 4*

By using meta-nitro-aniline in place of para-nitro-aniline in Example 1, a pigment was obtained which gave reddish shades of brown when used in printing lacquers or printing inks. The fastness properties were very good.

The product is represented by the formula

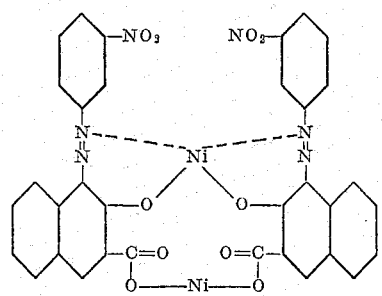

*Example 5*

A pigment was made as described in Example 1 except that 119 parts of $NiCl_2.6H_2O$ and 122 parts of $BaCl_2.2H_2O$ were used in place of 262 parts of $NiCl_2.6H_2O$. The pigment obtained was similar in shade and fastness to light. The pigment obtained from a mixture of equivalent parts of nickel and cobalt was also a maroon of good light fastness. When a mixture of equivalent parts of nickel chloride and manganese sulfate was used, the pigment obtained was yellower but the light fastness was also good.

*Example 6*

The monazo color made by coupling the diazo of 162 parts of 2,5-dichloraniline with 200 parts of 2-hydroxy-3-naphthoic acid, as in Example 1, was slurried in water. A water solution containing 60 parts of $CaCl_2$ was added to the slurry, followed by a solution of 119 parts of $NiCl_2.6H_2O$ in 300 parts water and 600 parts strong ammonium hydroxide solution. The slurry was heated to 90° C., held at this temperature about two hours and filtered. The dried pigment, rubbed in lithographic varnish, gave a dark red ink, non-bleeding in oil, and of good light fastness. The compound is represented by the formula

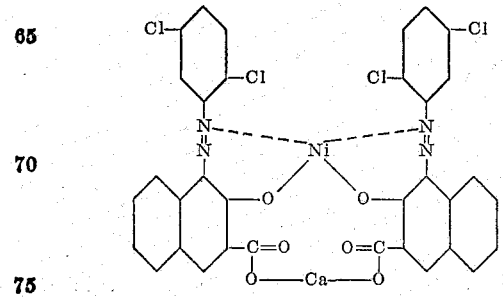

Example 7

Aniline (93 parts) was diazotized with 300 parts of ice and 250 parts of 10 Normal hydrochloric acid and 200 parts of 5 Normal sodium nitrite. The solution of the diazonium chloride was added to an alkaline solution containing 200 parts of 2-hydroxy-3-naphthoic acid, 42 parts of sodium hydroxide and 159 parts of sodium carbonate in 4000 parts of water, the temperature being kept at 10° C. during the coupling. After the coupling was complete the insoluble monazo compound was filtered and washed with 5% brine. It was then stirred into 4000 parts of water and heated to 90° C. To this slurry was added a solution composed of 262 parts of nickel chloride (NiCl$_2$.6H$_2$O) in 500 parts of water and 500 parts of concentrated ammonium hydroxide solution. The slurry was held at 90° C. for 3 hours. The pigment was then filtered and washed.

The product is represented by the formula

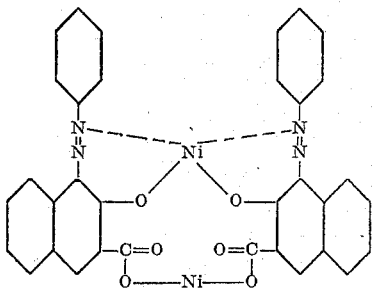

When this pigment was used for printing textiles, a red brown or dull red print was obtained of excellent light fastness and very good in other fastness tests.

This pigment was used for coloring paper both in the beater and in a wall paper coating. It gave dull red papers which were superior in light fastness to papers colored with other red pigments that are commercially used for this purpose.

This pigment was also prepared by using other basic compounds than ammonia in the reaction with nickel chloride. For example, diethanolamine, triethanolamine, pyridine or morpholine are sufficiently basic so that a similar brown pigment was obtained.

Example 8

Alpha-naphthylamine (143 parts) was diazotized in the usual way with 250 parts of 10 Normal hydrochloric acid and 200 parts of 5 Normal sodium nitrite. The filtered solution was added to a solution composed of 200 parts of 2-hydroxy-3-naphthoic acid dissolved in 4000 parts of water containing 42 parts of sodium hydroxide and 159 parts of sodium carbonate. The insoluble monazo color was filtered and washed. The filter cake was slurried in 3000 parts water. To this suspension was added 262 parts of nickel chloride (NiCl$_2$.6H$_2$O) and 93 parts of aniline. The mixture was then heated to 90° C. and held at this temperature for 3 hours. The pigment was then filtered, washed and dried. The dried pigment was rubbed into a lithographic varnish, resulting in a black ink having a violet tint. The fastness to light was very good.

The same pigment was obtained by using in place of 93 parts of aniline, an equivalent molecular proportion of phenyl ethanolamine or phenyl diethanolamine or 120 parts urea or 500 parts of concentrated ammonium hydroxide as the acid acceptor.

The following table shows the results obtained by using other diazo components than para-nitro-aniline, coupling with 2-hydroxy-3-naphthoic acid and then metallizing with the metal indicated and in the manner described in the foregoing examples. The properties of these pigments are similar to those heretofore described except where it is otherwise noted.

| Example | Diazo component | Metal | Color of textile print |
|---|---|---|---|
| 8 | Aniline | Cobalt | Red brown. |
| 9 | Para-chlor-aniline | do | Do. |
| 10 | ----do---- | Nickel | Do. |
| 11 | Meta-chlor-aniline | do | Do. |
| 12 | Meta-nitro-aniline | Cobalt | Do. |
| 13 | 3-nitro-4-chlor-aniline | do | Do. |
| 14 | ----do---- | Nickel | Do. |
| 15 | 2-chlor-4-nitro-aniline | Cobalt | Do. |
| 16 | ----do---- | Nickel | Do. |
| 17 | 2-nitro-4-amino-toluene | Cobalt | Brown. |
| 18 | ----do---- | Nickel | Red brown. |
| 19 | 2-amino-5-nitro-toluene | Cobalt | Do. |
| 20 | ----do---- | Nickel | Do. |
| 21 | o-Anisidine | ---do--- | Maroon. |
| 22 | p-Anisidine | do | Brown. |
| 23 | 2-amino-4-nitro-anisole | Cobalt | Bordeaux. |
| 24 | ----do---- | Nickel | Bordeaux (redder). |
| 25 | 2-amino-5-nitro-anisole | Cobalt | Bordeaux. |
| 26 | ----do---- | Nickel | Violet. |
| 27 | 3-chlor-4-ethoxy-aniline | Cobalt | Bordeaux. |
| 28 | ----do---- | Nickel | Do. |
| 29 | 4-amino-4'-ethoxy-diphenylamine | Cobalt | Blue. |
| 30 | ----do---- | Nickel | Do. |
| 31 | 4-picolinyl-amino-2,5-diethoxy-aniline | Cobalt | Violet. |
| 32 | ----do---- | Nickel | Do. |
| 33 | Alpha-naphthylamine | Cobalt | Do. |
| 34 | Beta-naphthylamine | do | Brown. |
| 35 | ----do---- | Nickel | Bordeaux. |
| 36 | Alpha-amino-anthraquinone | Cobalt | Red brown. |
| 37 | ----do---- | Nickel | Do. |

Examples of other suitable diazo components are ortho-, meta-, para-toluidine; meta- and para-xylidine; ortho-, meta- and para-chlor-aniline; ortho-, meta- and para-bromo-aniline; chloro-toluidines; ortho-, meta- and para-anisidine; ortho-, meta- and para-phenetidines; chloro-anisidines; chloro-phenetidines; 2,5-dimethoxy-aniline; nitro-chlor-anilines; nitro-anisidines; nitro-phenetidines; meta-amino-benzo-trifluoride; dichlor-anilines; trichlor-anilines; nitro-toluidines; nitro-chlor-toluidines; benzoyl-meta- and para-phenylene-diamine; meta- and para-amino-acetophenone; meta- and para-amino-benzophenone; ortho-, meta- and para-amino-phenyl-alkyl sulfones; para-dodecyl-aniline; ortho-, meta- and para-amino-benzene-sulfon-dimethyl-amides; ortho-, meta-, and para-cyano-aniline; ortho-, meta- and para-amino alkyl benzoates; ortho-, meta- and para-amino-diphenyl-ether; 4-nitro-4'-amino-diphenyl-sulfide; 4-amino-diphenyl-amine; 4-amino, 4'-ethoxy-diphenyl-amine; 2- and 4-amino-diphenyl; 2-amino-benzothiazol; 2-amino-6-ethoxy-benzothiazol; 2-amino-4-methyl-thiazol; 5-, 6- and 8-amino-quinoline; 1-phenyl-3-methyl-4-amino-5-chlor-pyrazol.

The coupling component is 2-hydroxy-3-naphthoic acid which may be substituted on the ring not containing the hydroxy group with halogen, nitro, alkyl or alkoxy groups. Examples of such substituted coupling components are 6-chloro-6-bromo-, 5-nitro-, 8-nitro-, 6-methyl-, 6-ethoxy- and 6-methoxy-2-hydroxy-3-naphthoic acid.

The compounds in the form which is devoid of coordinated molecules are represented in general by the formula

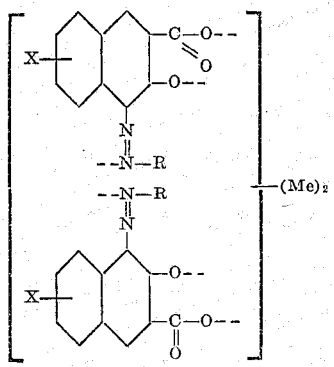

wherein one of the Me atoms is one of a group consisting of nickel and cobalt and the other Me atom is from a group consisting of nickel, cobalt, chromium, iron, manganese, calcium, barium, strontium, cadmium, copper and zinc; X is one of a group consisting of hydrogen, bromine, chlorine, nitro, methyl, methoxy and ethoxy; and each R is the residue of an arylamine having one diazotizable amine group which is devoid of hydroxy groups ortho to the amino group, carboxy and sulfonic acid groups.

The above formula is a representation of a structure based on the results of analyses of the compounds but the exact structure of the compounds is not known. They may be mono-molecular or polymolecular but their stability and analyses indicate that they are not like the structures of the known salts made by laking the colors shown as Color Index Nos. 35,160, 163,166 and 190 with alkaline earths. Analyses show that the products contain two metal atoms per four atoms of azo nitrogen. The analyses indicate that the products are metal salts or complexes of nickel or cobalt. Such an arrangement may be a tetrahedral structure where the one cobalt or nickel atom is a nuclear atom bonded to each of the hydroxy oxygens and to one of the nitrogens in each azo bridge. The compounds may contain ammonia, water or other coordinated molecules from traces to about two molecules per two molecules of the monazo or they may be devoid of such molecules. When such a molecule is present, it is believed to be coordinated with the nuclear nickel or cobalt, but the exact manner in which it is combined is not known. The formula accounts for the structure without coordinated molecules as suggested by analyses, but it is to be understood that the suggested structure is hypothetical and the invention is not restricted thereto.

The compounds of the present invention are useful where a low cost pigment and high stability to light are important considerations. Their generally good properties, excellent light fastness, special properties and low cost adapt them for uses such as the coloring of paper, the coloring of lacquers for textile printing and for paints but they can be used in many other kinds of compositions where pigments are used. Because of the relatively low cost of the constituent substances used for making the pigments of the invention and of the relatively low cost of processing necessary to produce the new combinations, the products of the invention are relatively economical to prepare as compared with other pigments of similar shade and equally good light stability.

The metallization does not go to completion in the presence of free mineral acids. A sufficient amount of an alkaline compound must be available in the medium as an acid acceptor to combine with the free acid as it is liberated from the inorganic salt and as the metallization proceeds. The pH value of the metallization medium should be greater than about 6.5. The term "acid acceptor" in the specification and claims refers to an alkaline compound which is added to the metallization medium to maintain a pH value greater than 6.5 and which will combine with the free mineral acid as it is liberated during metallization. Any alkaline substance which functions in the manner indicated can be used instead of the acid acceptors heretofore specifically mentioned. Illustrations of such other compounds are propylamine, mono-, di- and trimethylamine, ethylamine, formamide, acetamide, dimethyl formamide, hexylamine, cyclohexylamine, methyl glucamine, taurine, beta-dimethyl amino propanol sulfonic acid, toluidines, xylidines, naphthylamines, diphenylamine, piperazine, dimethyl sulfanilic acid, melamine, pyrrole, indole, carbazole, hexa methyleneimine, hexa methylene tetramine, mono and di-methyl glycine, dimethylol urea, sodium formate and sodium oxalate, potassium glycolate, potassium gluconate, potassium tartrate, sodium citrate, sodium maleate, sodium succinate and sodium chloracetate. Some of these basic compounds coordinate with the metal complex in the manner similar to that which ammonia coordinates with the compound described in Example 1. This coordination depends to a large extent on the basic compound used and upon particular conditions present in the process of treatment.

The time and temperature used in the metallization can be varied considerably, such as temperatures of 50° C. to 120° C. When temperatures above 100° C. are used, the metallization is conducted in closed containers at pressures above one atmosphere. With the more active acid acceptors, metallization temperatures of about 50° C. to about 100° C. are preferred. Higher temperatures are useful to vary the metallization reaction when a variation in the reaction between the azo compound and the metal or between the acid and the acid acceptor is desired.

Other modifications can be used by varying the azo compound used, the acid acceptor, the temperature of metallization, the concentration of the metallization medium and by mechanical variations such as the rate and duration of stirring during metallization.

The azo compound in the form of its acid or as a salt of the acid, such as an alkali metal or the ammonia salt, can be used. Any water soluble inorganic or organic salt of the various metals can be used, such as the chloride, sulfate, nitrate, or acetate. In the metallizing operation, the mixture is always alkaline, preferably having a pH value of about 7 to 10, and the salt of the metallizing metal may be present in the molecular proportion which is needed as indicated by the formula given herein for the compounds, but a moderate excess, say about 10% of the salt over the amount indicated by theory, is desirable.

From the foregoing disclosure it will be recognized that the invention is susceptible of modification without departing from the spirit and scope thereof and it is to be understood that the invention is not restricted to the specific illustrations thereof herein set forth.

We claim:
1. A metallized azo pigment which is represented by the formula

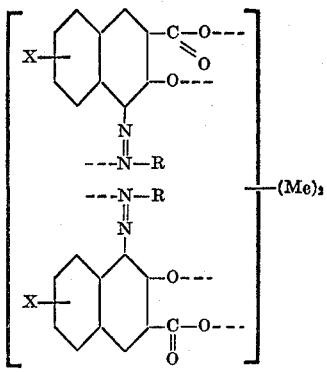

wherein one of the Me atoms is in coordinate linkage with the two monazo molecules and the same is one of a group consisting of nickel and cobalt and the other Me atom is in linkage with the carboxy groups and the same is from a group consisting of nickel, cobalt, chromium, iron, manganese, cadmium, copper, calcium, barium, strontium and zinc; X is one of a group consisting of hydrogen, bromine, chlorine, nitro, methyl, methoxy and ethoxy; and each R is the residue of an arylamine having one diazotizable amine group which is devoid of hydroxy groups ortho to the amino group, carboxy and sulfonic acid groups.

2. An azo pigment in accordance with claim 1 in which Me is nickel.

3. An azo pigment in accordance with claim 1 in which R is the residue of an arylamine of the benzene series and Me is nickel.

4. The azo pigment in accordance with claim 1 which is represented by the formula

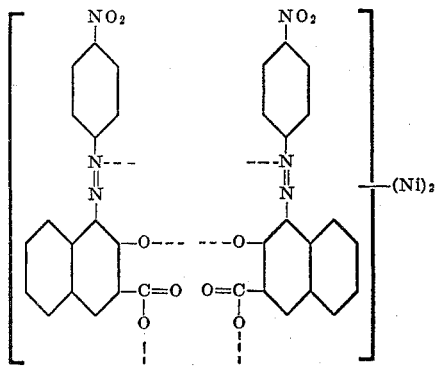

5. The azo pigment in accordance with claim 1 which is represented by the formula

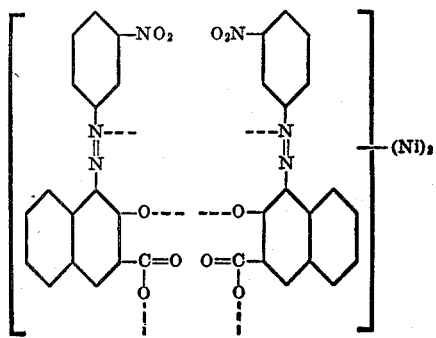

6. The azo pigment in accordance with claim 1 which is represented by the formula

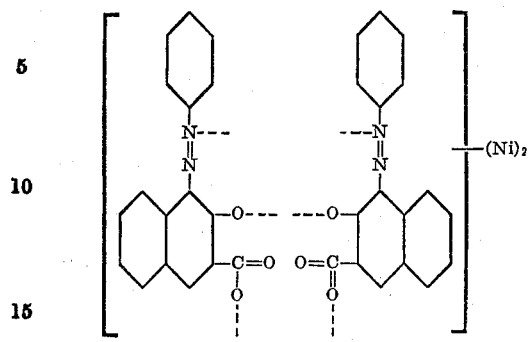

7. The process which comprises making a slurry of a monazo compound which in its acid form is represented by the formula

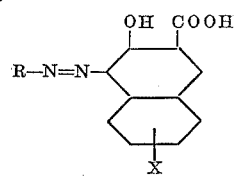

wherein R is the radical of an amino benzene having one diazotizable amine and which is devoid of hydroxy groups ortho to the amino group, carboxy and sulfonic acid groups and X is one of a group consisting of hydrogen, bromine, chlorine, nitro, methyl, methoxy and ethoxy; adding one portion of a water soluble salt of a metal of the group consisting of nickel and cobalt sufficient to coordinate one atom of said metal with two molecules of the monazo compound and another portion of a water soluble salt of a metal of the group consisting of nickel, cobalt, chromium, iron, manganese, cadmium, copper, calcium, barium, strontium, and zinc sufficient to combine one of said metal atoms with the carboxy groups of said two molecules of said monazo compound; and heating until a metallized compound is formed which contains metal atoms in the proportion of one metal atom of each of said portions to four azoic nitrogens; said medium being adjusted to a pH value greater than 6.5.

DONOVAN E. KVALNES.
HAROLD E. WOODWARD.